United States Patent
Knolla et al.

(10) Patent No.: US 8,650,427 B2
(45) Date of Patent: Feb. 11, 2014

(54) ACTIVITY ALIGNMENT ALGORITHM BY MASKING TRAFFIC FLOWS

(75) Inventors: William Knolla, Folsom, CA (US);
Douglas R. Moran, Folsom, CA (US);
Neil W. Songer, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 13/077,727

(22) Filed: Mar. 31, 2011

(65) Prior Publication Data
US 2012/0254644 A1    Oct. 4, 2012

(51) Int. Cl.
*G06F 1/00* (2006.01)

(52) U.S. Cl.
USPC ........................................ 713/323

(58) Field of Classification Search
None
See application file for complete search history.

(56) References Cited

U.S. PATENT DOCUMENTS

| | | | |
|---|---|---|---|
| 6,507,886 B1 * | 1/2003 | Chen et al. | 711/5 |
| 7,719,982 B2 | 5/2010 | Varma | |
| 7,725,750 B2 * | 5/2010 | Ashish et al. | 713/323 |
| 8,286,011 B2 * | 10/2012 | Satsangi et al. | 713/300 |
| 2002/0141580 A1 * | 10/2002 | Okuyama | 380/201 |
| 2003/0101015 A1 * | 5/2003 | Douskey et al. | 702/120 |
| 2004/0024971 A1 | 2/2004 | Zohar et al. | |
| 2009/0164818 A1 | 6/2009 | Kwa et al. | |

OTHER PUBLICATIONS

Mahesh Wagh, "PCI Express* 3.0 Technology: Device Architecture Optimizations on Intel Platforms," IDF2009 Intel Developer Forum, Sep. 22, 2009, pp. 3, 13, and 15-19.
International Search Report and Written Opinion for PCT/US2012/026661, mailed Dec. 12, 2012, 9 pages.

* cited by examiner

*Primary Examiner* — Chun Cao
*Assistant Examiner* — Zhipeng Wang
(74) *Attorney, Agent, or Firm* — Schwabe, Williamson & Wyatt, P.C.

(57) ABSTRACT

Embodiments of methods and apparatus for entering an activity alignment on state from an activity alignment off state; masking one or more traffic flows that are received during at least a part of the activity alignment on state; and entering the activity alignment off state from the activity alignment on state, after being in the activity alignment on state for at least a first time period, based at least in part on said masking the one or more traffic flows. Additional variants and embodiments are also disclosed.

19 Claims, 4 Drawing Sheets

_US 8,650,427 B2_

ACTIVITY ALIGNMENT ALGORITHM BY MASKING TRAFFIC FLOWS

TECHNICAL FIELD

Embodiments of the present disclosure relate generally to activity alignment algorithms, and more particularly, to methods and apparatuses for activity alignment algorithms in which traffic flows are selectively masked.

BACKGROUND

In today's technological world, performances of electronics devices are improving at a rapid pace, with a rapid increase in their computing power. With this increase, the devices are becoming power hungry, i.e., consuming more power. To save power, a processor in a device may sometimes enter a low power mode during brief periods of inactivity. Power management for computing systems are desired for many reasons, including prolonging battery life in a mobile computing device, reducing heat dissipation and cooling requirement, and reducing operating costs from energy and cooling.

BRIEF DESCRIPTION OF THE DRAWINGS

Embodiments of the present disclosure will be described by way of example embodiments, but not limitations, illustrated in the accompanying drawings in which like references denote similar elements, and in which.

DETAILED DESCRIPTION

Illustrative embodiments of the present disclosure include, but are not limited to, methods and apparatuses for activity alignment algorithms by masking traffic flows.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
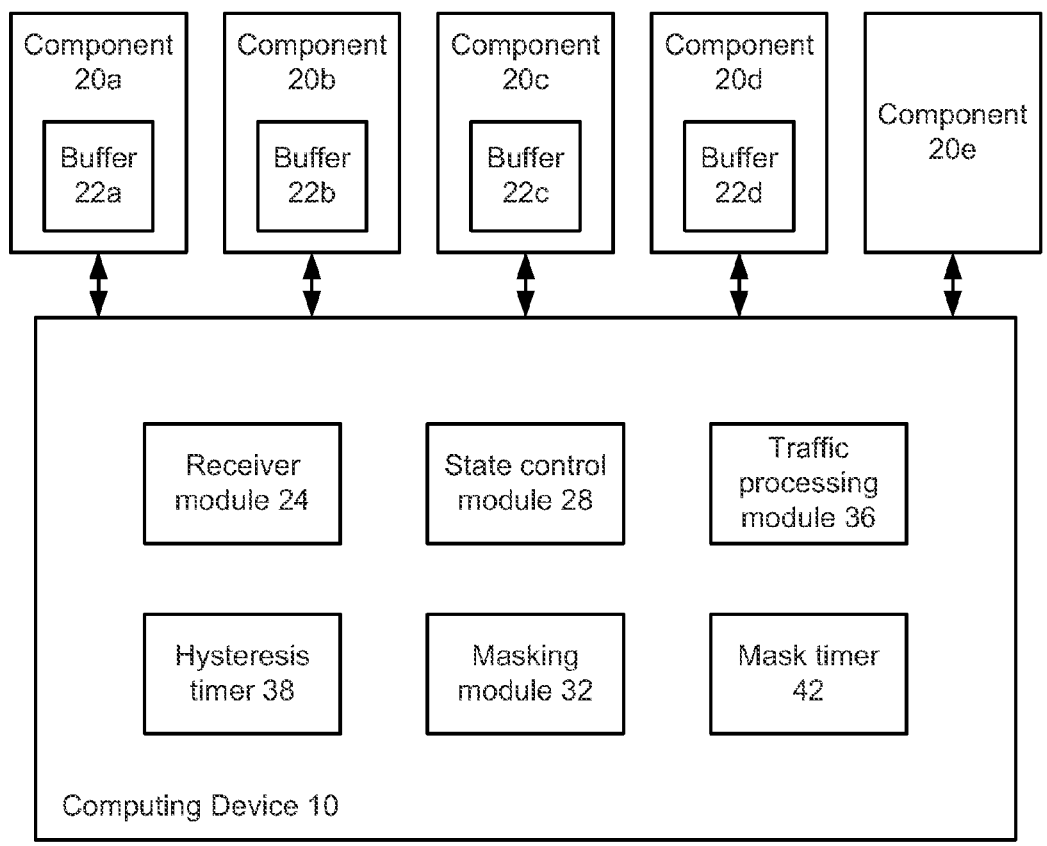
FIG. 1 schematically illustrates a computing device, in accordance with various embodiments of the present disclosure.

FIG. 1 schematically illustrates a computing device 10, in accordance with various embodiments of the present disclosure. In various embodiments, the computing device 10 may be, for example, a laptop, a cell phone, a personal computer, a mobile computing device, a personal digital assistant, a palmtop, a set-top box, an appropriate consumer electronic device, or any other appropriate type of computing device.

The computing device 10 may be communicatively coupled to a plurality of components 20a, . . . , 20e. In various embodiments, the plurality of components 20a, . . . , 20e may include one or more hardware/software components associated with the computing device 10. Although FIG. 1 illustrates each of the plurality of components 20a, . . . , 20e to be external to the computing device 10, in various embodiments, one or more of the plurality of components 20a, . . . , 20e may be internal to the computing device 10. The components 20a, . . . , 20e may include, for example, external devices coupled to the computing device 10, and/or devices/hardware internal to the computing device 10, including but not limited to a universal serial bus (USB) device (including devices compatible with various versions of the USB standard, e.g., USB 2.0, 3.0, etc.), a peripheral component interconnect (PCI) device, a PCI Express (PCIe) device, a network interface card, a peripheral device, a printer, a scanner, a disk drive, a camera, a network adapter, a serial advanced technology attachment (SATA), a parallel advanced technology attachment (PATA), an inter-integrated circuit (I2C), a secure digital (SD) device, a serial peripheral interface (SPI) bus, a system management bus (SMBus), etc.

Although not illustrated, the components 20a, . . . , 20e may include one or more controllers configured to control one or more devices/functions in the computing device 10, including but not limited to, a USB host controller, a memory controller, an Ethernet controller, a graphics controller, a hard disk controller (HDD), an audio controller, an advanced host controller interface (AHCI), etc. In various embodiments, the components 20a, . . . , 20e may include one or more software applications running on the computing device 10, one or more device drivers, an operating system, etc.

One or more of the components 20a, ..., 20e may include (or be otherwise associated with) a corresponding buffer. For example, the component 20a may include a buffer 22a, the component 20b may include a buffer 22b, and so on, as illustrated in FIG. 1. In various embodiments, one or more of the components 20a, ..., 20e, e.g., the component 20e may not include (or be otherwise associated with) a corresponding buffer, as illustrated in FIG. 1. In FIG. 1, a buffer associated with a component (e.g., buffer 22a of the component 20a) is illustrated to be included in the component. However, in various other embodiments, a buffer associated with a component (e.g., the buffer 22a of the component 20a) may be external to the component (e.g., included in the computing device 10 (e.g., in the receiver module 24) or located in any other appropriate place), and may be configured to buffer data packets that are transmitted to and/or from the component.

The computing device 10 may include a receiver module 24 that may be configured to receive one or more traffic flows from a corresponding one or more of the components 20a, ..., 20e. In various embodiments, traffic flow may refer to a transmission or flow of one or more data packets from, e.g., one of the components 20a, ..., 20e to the computing device 10.

The computer device 10 may include a state control module 28 that is configured to control an activity alignment state of the computing device 10. For example, the activity alignment state of the computing device 10 may either be on (e.g., also referred to herein as an activity alignment on state) or off (e.g., also referred to herein as an activity alignment off state), as discussed in more detail herein.

Traffic from a component to the computing device 10 may be categorized either as demand traffic or opportunistic traffic. Opportunistic traffic may be a traffic from a component (e.g., component 20a), which the component may opportunistically align with the activity alignment on state of the computing device 10. For example, if the component 20a desires to transmit traffic (e.g., one or more data packets associated with the traffic) to the computing device 10 while the computing device 10 is in the activity alignment off state, the component 20a may wait until the computing device 10 enters the activity alignment on state. Once the computing device 10 enters the activity alignment on state, the component 20a may transmit the traffic to the computing device 10. That is, the component 20a may align the flow of the traffic with the activity alignment on state of the computing device 10. In various embodiments, such traffic may be referred to as opportunistic traffic, and the associated traffic flow may be referred to as opportunistic traffic flow.

Opportunistic traffic may be a delay tolerant traffic, e.g., the component 20a may delay the flow of the opportunistic traffic to the computing device 10 (e.g., until the computing device 10 enters the activity alignment on state) to a certain extent (e.g., based on a capacity and status of the corresponding buffer). In an example, the component 20a may receive and/or generate data packets that the component 20a may desire to transmit to the computing device 10. The component 20a may delay the transmission of the data packets to the computing device 10, e.g., by buffering the data packets in the buffer 22a, until the computing device 10 enters the activity alignment on state. Once the computing device 10 enters the activity alignment on state, the component 20a may transmit the buffered data packets from the buffer 22a to the computing device 10 in the form of the opportunistic traffic flow, and subsequently flush the buffer 22a.

While the computing device 10 is in the activity alignment on state, the computing device 10 (e.g., the state control module 28) may signal or transmit a request to one or more of the components 20a, ..., 20e to transmit opportunistic traffics to the computing device 10. On the other hand, while the computing device 10 is in the activity alignment off state, the computing device 10 (e.g., the state control module 28) may signal or transmit a request to one or more of the components 20a, ..., 20e to refrain from transmitting any opportunistic traffic to the computing device 10.

In various embodiments, demand traffic flow may refer to a transmission or flow of data packets that a component (e.g., component 20b) may desire to send to the computing device 10 without any substantial delay. In an example, the component 20b may receive and/or generate data packets that the component 20b may desire to transmit to the computing device 10. The component 20b may not delay the transmission of the data packets to the computing device 10 because, for example, the data packets are of relatively high priority, the buffer 22b is full, and/or for some other appropriate reason. Such data packets may be transmitted by the component 20b to the computing device 10, e.g., irrespective of the activity alignment state of the computing device 10. In various embodiments, demand traffic may be delay in-tolerant traffic, as a component may transmit the demand traffic without any substantial delay (e.g., irrespective of the activity alignment state of the computing device 10).

As discussed, in various embodiments, traffic from a component to the computing device 10 may be either demand traffic or opportunistic traffic based at least in part on a type of the associated data packets, a type of the component from which the traffic originates, status of the corresponding buffer (e.g., if the buffer has capacity to buffer data packets), and/or the like. In an example, opportunistic traffic may be converted to demand traffic if, for example, the corresponding buffer is almost full due to storage of data packets associated with the opportunistic traffic. In various embodiments, traffic flows originating from, for example, the component 20e may be demand traffic due to, for example, a lack of buffer in the component 20e to buffer data packets. In various embodiments, traffic flows originating from a component may always be demand traffic flows if, for example, the component does not support transmission of opportunistic traffic flows.

In various embodiments, the computing device 10 may also include a masking module 32 that is configured to selectively mask one or more traffic flows from a corresponding one or more components to the computing device 10. In various embodiments, the computing device 10 may also include a hysteresis timer 38 and a mask timer 42. In various embodiments, the computing device 10 may also include a traffic processing module 36 configured to process data packets of the traffic flows received by the receiver module 24.

Although not illustrated in FIG. 1, the computing device 10 may include or be coupled to one or more other components, e.g., a memory (e.g., for storing information and/or instructions to be executed by one or more components of the computing device 10), one or more antennas (e.g., an omnidirectional antenna), a processor, etc.

Figure 2:
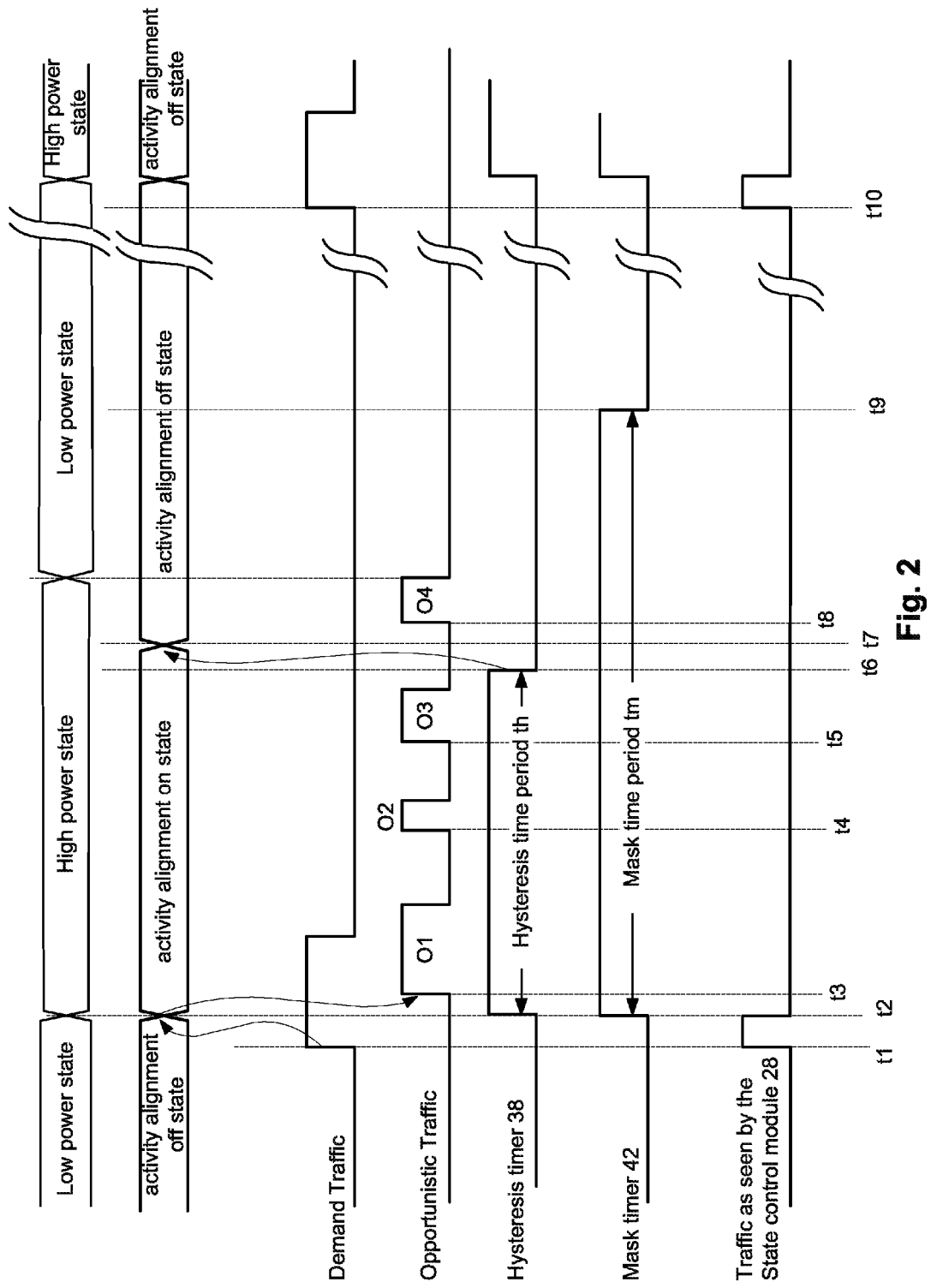
FIG. 2 illustrates an example timing diagram associated with an operation of the computing device of FIG. 1, in accordance with various embodiments of the present disclosure.

FIG. 2 illustrates an example timing diagram associated with an operation of the computing device 10 of FIG. 1, in accordance with various embodiments of the present disclosure. FIG. 2 illustrates demand and opportunistic traffic flows received by the computing device 10 from one or more of the components 20a, ..., 20e, the activity alignment state of the computing device 10, the state of the hysteresis timer 38 and the mask timer 42, traffic as seen by the state control module 28, and a power consumption of the computing device 10.

Referring to FIGS. 1 and 2, prior to time t1, the computing device 10 may be in the activity alignment off state, during which the computing device 10 may not receive any demand and/or opportunistic traffic. At time t1, the computing device 10 (e.g., the receiver module 24) may receive demand traffic flow from, for example, the component 20*a*.

In response to receiving the demand traffic flow at time t1, the computing device 10 (e.g., the state control module 28) may enter the activity alignment on state from the activity alignment off state at time t2, as illustrated in FIG. 2. Furthermore, in response to entering the activity alignment on state at time t2, the computing device 10 may activate the mask timer 42.

Moreover, as discussed in more detail herein and as also illustrated in FIG. 2, from time t2, the state control module 28 may cease to detect the demand traffic. Accordingly, the state control module 28 may activate the hysteresis timer 38 from time t2. In various embodiments, the hysteresis timer 38 may remain active until the expiration of a hysteresis time period th or if the state control module 28 detects any traffic, whichever occurs first.

Also, in response to entering the activity alignment on state at time t2, the computing device 10 (e.g., the state control module 28) may signal or transmit a request to one or more of the components 20*a*, . . . , 20*e* to transmit opportunistic traffic to the computing device 10 (e.g., request one or more of the components 20*a*, . . . , 20*e* to align their opportunistic traffic with the activity alignment on state).

In response to entering the activity alignment on state, one or more opportunistic traffic flows may be received from one or more corresponding components (e.g., components 20*a*, . . . , 20*e*), as illustrated in FIG. 2. In FIG. 2, the opportunistic traffic flows are illustrated to be received in bursts, e.g., opportunistic traffic flows O1, O2, O3 and O4. However, in various other embodiments, the opportunistic traffic flows may be received in a continuous manner while the computing device 10 is in the activity alignment on state. Although not illustrated in FIG. 2, in various embodiments, one or more of the bursts of the opportunistic traffic flows O1, O2, O3 and O4 may at least in part overlap.

As an example, when the computing device 10 enters the activity alignment on state at time t2, the computing device 10 may request one or more of the components 20*a*, . . . , 20*e* to transmit opportunistic traffic to the computing device 10. In various embodiments, at time t3, the component 20*b* may transmit the opportunistic traffic O1 to the computing device 10. A delay (represented by a time gap between time t2 and t3) in the component 20*b* transmitting the opportunistic traffic O1 to the computing device 10 may be due to, for example, latency or delay associated with the component 20*b* receiving the request from the computing device 10 associated with transmission of the opportunistic traffic, processing the request and/or the actual transmission of the opportunistic traffic O1. As another example, at time t4, the component 20*e* may transmit the opportunistic traffic O2 to the computing device 10, wherein a delay (represented by a time gap between time t2 and t4) in the component 20*e* transmitting the opportunistic traffic O2 to the computing device 10 may be due to, for example, latency or delay associated with the component 20*e* receiving the request from the computing device 10 associated with transmission of the opportunistic traffic, processing the request and/or the actual transmission of the opportunistic traffic O2.

As yet another example, at time t5, the computing device 10 may still be in the activity alignment on state, and the component 20*b* may once again send opportunistic traffic O3. For example, after sending the opportunistic traffic O1, the component 20*b* may flush the buffer 22*b* (or at least a part of the buffer 22*b*, as data packets from the buffer 22*b* may be transmitted to the computing device 10 as the opportunistic traffic O1). After transmitting the opportunistic traffic O1, the buffer 22*b* (or at least a part of the buffer 22*b*) may be filled again with new data packets. As the computing device 10 is still in the activity alignment on state, at time t5, the component 20*b* may once again send the opportunistic traffic O3.

Referring again to FIGS. 1 and 2, once activated or enabled, the mask timer 42 may be on (e.g., may remain active or enabled) for a time period tm (also referred to herein as a mask time period). In various embodiments, while the mask timer 42 is enabled, one or more traffic flows (e.g., part of the demand traffic after time t2, the opportunistic traffics O1, . . . , O4) received by the receiver module 24 may be masked (e.g., by the mask module 32) from the state control module 28, such that these traffic flows are not detectable by the state control module 28 (e.g., are not detectable for the purposes of changing the activity alignment state of the computing device 10). FIG. 2 also illustrates traffic flow seen by the state control module 28. As illustrated in FIG. 2, due to the masking operation, part of the demand traffic (e.g., which is received after time t2) and the opportunistic traffics O1, . . . , O4 are not seen or detected by the state control module 28.

Referring again to FIGS. 1 and 2, once activated or enabled, the hysteresis timer 38 may be on (e.g., may remain active or enabled) for the hysteresis time period th, unless the state control module 28 detects any traffic flow from a component to the computing device 10 during the hysteresis time period th. In various embodiments, the time periods th and tm may be pre-determined and/or may be user adjustable parameters. In various embodiments, the time periods th and tm may be dynamically tuned (e.g., based on traffic activity patterns of the computing device 10). In various embodiments, the time period tm may be relatively longer than the time period th.

As previously discussed, the state control module 28 activates the hysteresis timer 38 after the state control module 28 ceases detecting the demand traffic at time t2 (e.g., due to the masking of the demand traffic at time t2). From time t2 to at least time t6 (i.e., when the hysteresis timer 38 expires), the state control module 28 does not detect any traffic. Accordingly, with the expiration of the hysteresis timer 38 at time t6, the state control module 28 may change the activity alignment state of the computing device 10, at time t7, from the activity alignment on state to the activity alignment off state. That is, at time t7, the computing device 10 may enter the activity alignment off state.

In various embodiments, even after entering the activity alignment off state, the computing device 10 may receive opportunistic traffic O4 at time t8. For example, while in the activity alignment on state, the computing device 10 may transmit a request to the component 20*c* (along with transmitting the request to various other components) to transmit opportunistic traffic. However, due to, for example, latency or delay involved in receiving the request, processing the request and/or transmitting the data packets from the buffer 22*c*, the actual opportunistic traffic O4 may be received from the component 20*c* at time t8 (i.e., after the computing device 10 has entered the activity alignment off state).

The mask timer 42 may expire (e.g., be disabled, deactivated, or switched off) at time t9 (i.e., at the end of the mask time period tm). Subsequent to time t9, traffic flow from a component to the computing device 10 may again be detectable or seen by the state control module 28. For example, at time t10, the computing device 10 may again receive demand traffic from one of the components 20a, ..., 20e, based on which the computing device 10 may once again enter the activity alignment on state, and the mask timer 42 and the hysteresis timer 38 may once again be activated, as illustrated in FIG. 2.

In various embodiments, the mask time period tm may be sufficiently long such that any opportunistic traffic (e.g., O4), received after the computing device 10 enters the activity alignment off state, may cease flowing before the expiration of the mask timer 42. That is, the mask time period tm may be sufficiently long such that no opportunistic traffic flows, resulting from the activity alignment on state between times t2 and t7, are received after the expiration of the mask timer 42 at time t9.

In various embodiments, a power consumption of the computing device 10 may be associated with reception of traffic flows by the computing device 10. For example, prior to time t1, while no traffic is received by the computing device 10, the computing device 10 may remain in a low power state (e.g., a sleep or an idle mode). However, from time t2 (i.e., from the time the computing device 10 detects and processes the demand traffic), the computing device 10 may remain in a high power state (e.g., a wake state or a full power state) until opportunistic traffics O1, ..., O4 are received and processed by the computing device 10. In various embodiments, after the computing device 10 receives and processes the last burst of opportunistic traffic O4, the computing device 10 may once again enter the low power state until, e.g., demand traffic is again received at time t10.

Opportunistic traffic flow from a component (e.g., component 20b) may allow the component to flush existing data packets (which are transmitted as a part of the opportunistic traffic flow) from the associated buffer (e.g., buffer 22b), and subsequently fill the buffer with new data packets. In various embodiments, the activity alignment on state is also referred to herein as Opportunistic Buffer Flush & Fill (OBFF) state and the activity alignment off state is also referred to herein as an idle state. Various embodiments of the present disclosure may be used at least in part in accordance with the OBFF state, as presented in, e.g., the Peripheral Component Interconnect Express (PCIe) Base specifications, e.g., PCIe Base 2.0 specification, approved 15 Jan. 2007, along with any amendments, updates, and/or revisions.

In various embodiments, there may be several advantages of masking traffic flows from the state control module 28. For example, in various embodiments, the state control module 28 may not be able to distinguish between opportunistic traffic and demand traffic received by the receiver module 24. Accordingly, without the above discussed masking operation, the state control module 28 would have continued to detect opportunistic traffic flows (e.g., opportunistic traffics O1, O2, etc.) while the computing device 10 was in the activity alignment on state. Accordingly, without the masking operation, with each occurrence of the opportunistic traffics O1, O2, etc., the state control module 28 would have reset the hysteresis timer 38. Thus, without the masking operation, the computing device 10 would have remained in the activity alignment on state even after time t7, due to the reception of the opportunistic traffics O1, ..., O4. However, due to the above discussed masking operation, the computing device 10 may enter the activity alignment off state after the expiration of the time period th from time t2. The hysteresis timer 38 is reset only at time t2, and is not reset at, e.g., times t3, t4 and t5 (i.e., the hysteresis timer 38 is not reset each time opportunistic traffic is received after time t2, due to the masking of opportunistic traffics). The masking operation may ensure that the activity alignment on state lasts only for a pre-determined period of time and may ensure that the computing device 10 enters the activity alignment off state after the expiration of the pre-determined period of time, thereby saving power consumption of the computing device 10. Thus, the masking operation limits a duration of the activity alignment on state, while providing each of the components 20a, ..., 20e sufficient time to flush their respective buffers at least once.

Figure 3:
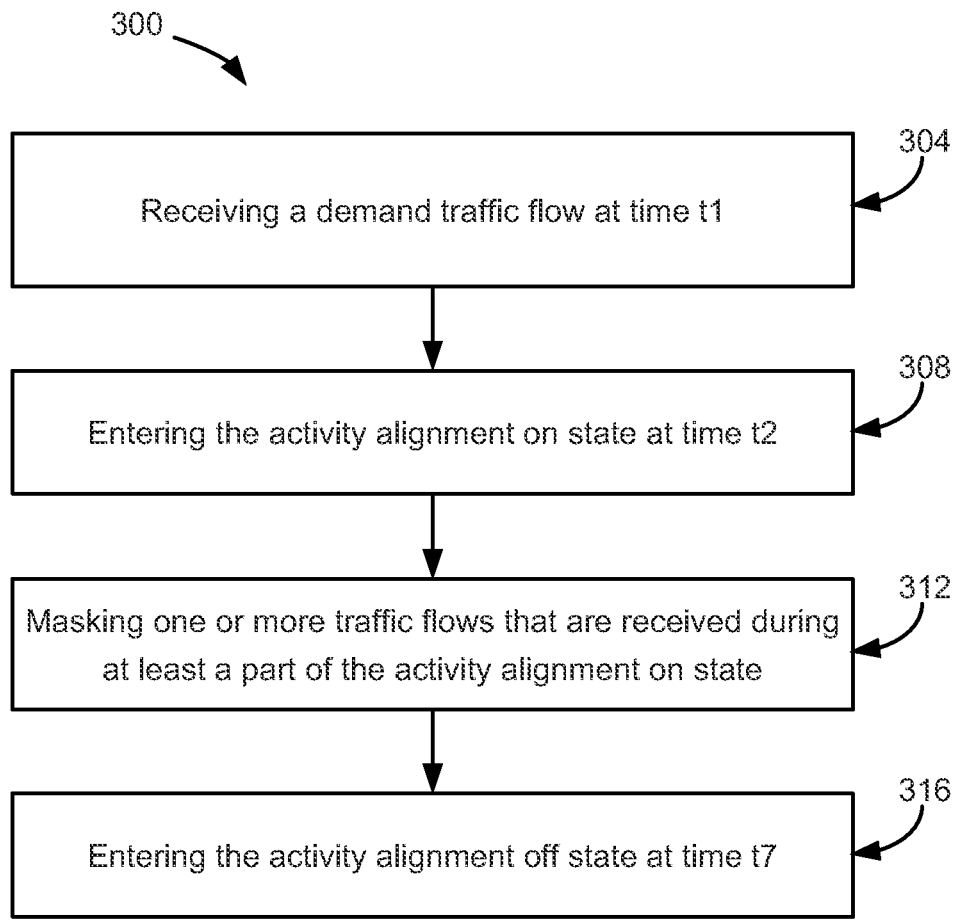
FIG. 3 illustrates an example method for operating the computing device of FIG. 1, in accordance with various embodiments of the present disclosure.

FIG. 3 illustrates an example method 300 for operating the computing device 10 of FIG. 1, in accordance with various embodiments of the present disclosure. Referring to FIGS. 1-3, at 304, the computing device 10 may receive demand traffic flow at time t1 (e.g., while the computing device 10 is in the activity alignment off state). At 308, in response to receiving the demand traffic flow, the computing device 10 may enter the activity alignment on state from the activity alignment off state at time t2. As previously discussed, upon entering the activity alignment on state, the computing device 10 (e.g., the state control module 28) may transmit a request to the components 20a, ..., 20e to transmit opportunistic traffics to the computing device 10. In response to transmitting the request, the computing device 10 may receive opportunistic traffic flows (e.g., O1, ..., O4) from the components 20a, ..., 20e.

At 312, the masking module 32 may mask, from the state control module 28, one or more traffic flows that are received during at least a part of the activity alignment on state. For example, the masking module 32 may mask the opportunistic traffics O1, ..., O4 and also the part of the demand traffic that is received after time t2. Furthermore, as the state control module 28 may not detect any traffic flow from time t2, the state control module 28 may activate the hysteresis timer 38 from time t2. The demand traffic and the opportunistic traffics O1, ..., O4 may not interrupt the hysteresis timer 38, as these traffics may not be detected by the state control module 28.

Accordingly, at 316, at the end of the hysteresis time period th at time t7, the computing device 10 may enter the activity alignment off state from the activity alignment on state (e.g., after being in the activity alignment on state for the hysteresis time period th).

Figure 4:
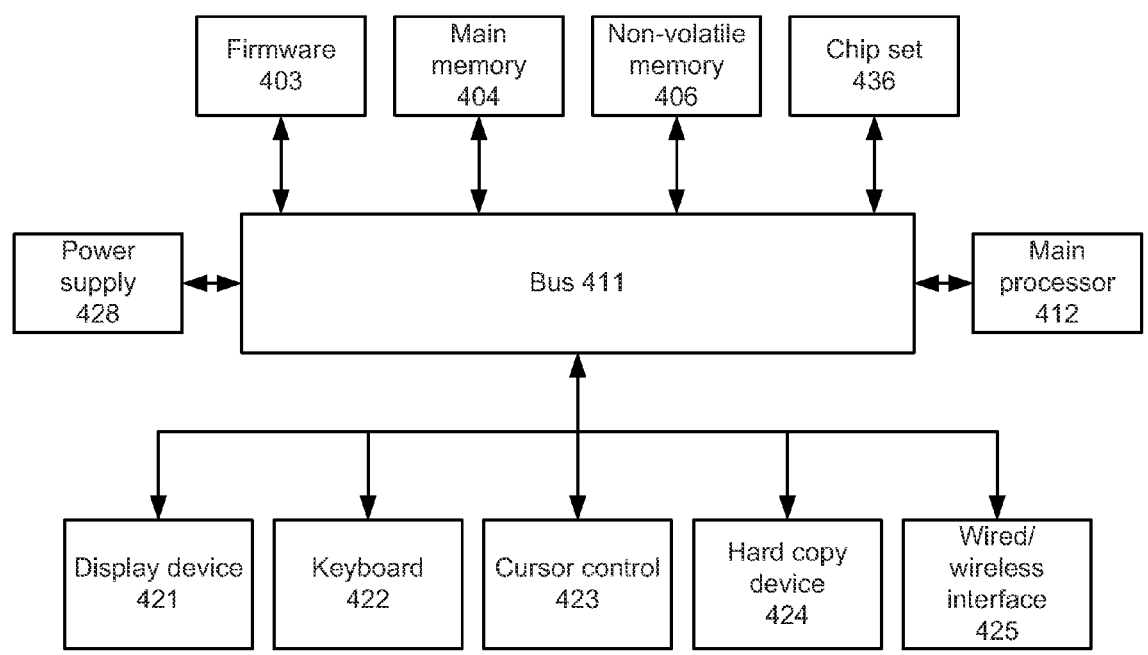
FIG. 4 schematically illustrates a block diagram of an example computer system that may be suitable for practicing some of the embodiments.

FIG. 4 schematically illustrates a block diagram of an example computer system 400 that may be suitable for practicing some of the embodiments, including a system for entering an activity alignment on state from an activity alignment off state; masking one or more traffic flows received during at least a part of the activity alignment on state; and entering the activity alignment off state from the activity alignment on state, after being in the activity alignment on state for at least a first time period, based at least in part on said masking the one or more traffic flows.

In some embodiments, the computer system 400 may include a communication mechanism or bus 411 for communicating information, and an integrated circuit component such as a processor 412 coupled with bus 411 for processing information.

Computer system 400 further comprises a random access memory (RAM) or other dynamic storage device 404 (referred to as main memory) coupled to bus 411 for storing information and instructions to be executed by processor 412. Main memory 404 (which may be a non-transitory memory) also may be used for storing temporary variables or other intermediate information during execution of instructions by processor 412.

Firmware 403 may be a combination of software and hardware, such as Electronically Programmable Read-Only Memory (EPROM) that has the operations for the routine recorded on the EPROM. The firmware 403 may embed foundation code, basic input/output system code (BIOS), or other similar code. The firmware 403 may make it possible for the computer system 400 to boot itself.

Computer system 400 also comprises a read-only memory (ROM) and/or other static storage device 406 coupled to bus 411 for storing static information and instructions for processor 412. The static storage device 406 may store OS level and application level software.

Computer system 400 may further be coupled to a display device 421, such as a cathode ray tube (CRT) or liquid crystal display (LCD), coupled to bus 411 for displaying information to a computer user. A chipset, such as chipset 436, may interface with one or more other components of the computer system 400.

An alphanumeric input device (keyboard) 422, including alphanumeric and other keys, may also be coupled to bus 411 for communicating information and command selections to processor 412. An additional user input device is cursor control device 423, such as a mouse, trackball, trackpad, stylus, or cursor direction keys, coupled to bus 411 for communicating direction information and command selections to processor 412, and for controlling cursor movement on a display device 421. A chipset, such as chip set 436, may interface with the input output devices.

Another device that may be coupled to bus 411 is a hard copy device 424, which may be used for printing instructions, data, or other information on a medium such as paper, film, or similar types of media. Furthermore, a sound recording and playback device, such as a speaker and/or microphone (not shown) may optionally be coupled to bus 411 for audio interfacing with computer system 400. Another device that may be coupled to bus 411 is a wired/wireless communication capability 425, which, in one embodiment, may be one or more antennas (e.g., an omnidirectional antenna).

Computer system 400 has a power supply 428 such as a battery, an AC power plug connection and rectifier, a DC power connection, and/or the like, as one of ordinary skill in the relevant art would appreciate based at least on the teachings provided herein.

In various embodiments, one or more components, e.g., components 20a, ..., 20e of FIG. 1 (not shown in FIG. 4) may be communicatively coupled to the computer system 400. The computer system 400 may also include, for example, a receiver module, a state control module, a traffic processing module, a hysteresis timer, a masking module and/or a mask timer, similar to those illustrated in FIG. 1.

In various embodiments, the receiver module may be coupled to the bus 411 and may receive traffic flows from the components 20a, ..., 20e. In various embodiments, the state control module 28 may control the activity alignment state of the computer system 400. In various embodiments, the processor 412 and the state control module may be co-disposed on an integrated circuit. In various embodiments, the processor 412 may be configured to operate as the state control module.

In various embodiments, the computer system 400, including the processor 412 and/or various hardware components, may have dimension or shape configured to facilitate the computer system 400 to be employed for mobile computing. In various embodiments, the computer system 400 may be used as a mobile phone, a laptop, a personal digital assistant, a palmtop, a MP3 player, a personal computer, a set-top box, or any other appropriate type of computing device. In various embodiments, the computer system 400 may be used as a mobile computing device. In various embodiments, the processor 412 and various components of the computer system 400 may be housed in a body having dimension or shape configured to facilitate the computer system to be employed for mobile computing.

In accordance with various embodiments, articles of manufacture may be provided that include non-transitory storage mediums having instructions stored thereon that, if executed, result in the operations described herein with respect to FIG. 3. For example, such storage mediums may be stored in the computing device 10 of FIG. 1. In an embodiment, each of the storage mediums comprises some type of memory (not shown). In accordance with various embodiments, the articles of manufacture may be computer-readable mediums such as, for example, software or firmware.

Although certain example methods, apparatus, and articles of manufacture have been described herein, the scope of coverage of the present disclosure is not limited thereto. On the contrary, the present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
    entering, by a computing device, an activity alignment on state from a first activity alignment off state;
    masking, by the computing device, one or more traffic flows that are received during at least a part of the activity alignment on state;
    activating, by the computing device, a hysteresis timer in response to entering the activity alignment on state and said masking the one or more traffic flows;
    entering, by the computing device in response to the hysteresis timer completing a first time period, a second activity alignment off state from the activity alignment on state, after being in the activity alignment on state for at least the first time period based at least in part on said masking the one or more traffic flows; and
    in response to the computing device entering the second activity alignment off state, requesting one or more components of the computing device to refrain from transmitting opportunistic traffics.

2. The method of claim 1, wherein said masking comprises:
    masking the one or more traffic flows from the state control module such that the one or more traffic flows are not detectable by a state control module.

3. The method of claim 2, wherein said masking further comprises:
    masking the one or more traffic flows such that the one or more other traffic flows are masked during at least a second time period, wherein the second time period commences in response to the computing device entering the activity alignment on state, and wherein the second time period is longer than the first time period.

4. The method of claim 3, further comprising:
    in response to entering the activity alignment on state, activating, by the computing device, a mask timer; and
    ending said masking the one or more traffic flows in response to the mask timer reaching the second time period.

5. The method of claim 1, further comprising:
in response to entering the activity alignment on state, requesting, by the computing device, a plurality of components to transmit opportunistic traffics to the computing device.

6. The method of claim 1, wherein said entering the activity alignment on state comprises:
receiving a demand traffic flow while the computing device is in the first activity alignment off state; and
in response to receiving the demand traffic flow, entering the activity alignment on state.

7. The method of claim 1, wherein the hysteresis timer remains active during the first time period, in spite of the computing device receiving the one or more traffic flows during the first time period, based at least in part on said masking the one or more traffic flows.

8. A computing device comprising:
a receiver module configured to receive a first traffic flow from a first component while the computing device is in a first activity alignment off state;
a state controller module configured to change an activity alignment state of the computing device to an activity alignment on state from the first activity alignment off state, based at least in part on the receiver module receiving the first traffic flow, wherein the state controller module is configured to request a plurality of components to transmit opportunistic traffics to the computing device while the computing device is in the activity alignment on state;
a masking module configured to mask a plurality of traffic flows, including the first traffic flow and one or more opportunistic traffic flows, from the state controller module in response to the computing device entering the activity alignment on state; and
a hysteresis timer configured to be activated, by the state controller module, in response to the masking module masking the plurality of traffic flows from the state controller module, and to be deactivated after a first time period based at least in part on said masking the plurality of traffic flows;
wherein the state controller module is configured to change the activity alignment state of the computing device to a second activity alignment off state from the activity alignment on state based at least in part on the hysteresis timer being deactivated, and request the plurality of components to refrain from transmitting opportunistic traffics in response to the computing device entering the second activity alignment off state.

9. The computing device of claim 8, wherein the masking device is configured to mask the plurality of traffic flows for at least a second time period that commences with the computing device entering the activity alignment on state, wherein the second time period is longer than the first time period.

10. The computing device of claim 8, wherein the masking module is configured to mask the plurality of traffic flows such that the plurality of traffic flows are not detectable by the state control module.

11. The computing device of claim 8, wherein the receiver module is configured to receive, in response to the request to transmit opportunistic traffics to the computing device, one or more opportunistic traffic flows from a corresponding one or more components of the plurality of components.

12. The computing device of claim 11, wherein the receiver module is configured to receive at least one of the one or more opportunistic traffic flows after the change of the activity alignment state of the computing device to the second activity alignment off state.

13. The computing device of claim 8, further comprising:
a traffic processing module configured to process data packets associated with the plurality of traffic flows.

14. The computing device of claim 11, wherein the first component is one of a universal serial bus (USB) device, a peripheral component interconnect (PCI) device and a PCI Express (PCIe) device.

15. A method comprising:
receiving, by a computing device, a first traffic flow while the computing device is in an idle state;
in response to receiving the first traffic flow, entering an Opportunistic Buffer Flush & Fill (OBFF) state;
in response to entering the OBFF state, receiving one or more other traffic flows;
masking the one or more other traffic flows;
entering the idle state from the OBFF state, after being in the OBFF state for at least a first time period based at least in part on said masking the one or more other traffic flows; and
in response to the computing device entering the idle state, requesting one or more components of the computing device to refrain from transmitting opportunistic traffics;
wherein said masking further comprises masking the one or more other traffic flows, such that: the one or more other traffic flows are masked during at least a first time period that commences in response to the computing device entering the OBFF state; and the one or more other traffic flows are not detectable for a purpose of changing a state of the computing device.

16. The method of claim 15, further comprising:
masking a part of the first traffic flow that is received after the computing device enters the OBFF state.

17. A system comprising:
a memory;
an antenna;
a receiver module configured to receive a first traffic flow from a first component while the system is in a first activity alignment off state;
a state controller module configured to change an activity alignment state of the system to an activity alignment on state from the first activity alignment off state, based at least in part on the receiver module receiving the first traffic flow, wherein the state controller module is configured to request a plurality of components to transmit opportunistic traffics to the system while the system is in the activity alignment on state;
a masking module configured to mask a plurality of traffic flows, including the first traffic flow and one or more opportunistic traffic flows, from the state controller module in response to the system entering the activity alignment on state; and
a hysteresis timer configured to be activated, by the state controller module, in response to the masking module masking the plurality of traffic flows from the state controller module, and to be deactivated after a first time period;
wherein the state controller module is configured to change the activity alignment state of the system to a second activity alignment off state from the activity alignment on state based at least in part on the hysteresis timer being deactivated, and request the plurality of components to refrain from transmitting opportunistic traffics in response to the system entering the second activity alignment off state.

18. The system of claim 17, wherein the masking module is configured to mask the plurality of traffic flows for at least a second time period that commences with the system entering the activity alignment on state, wherein the second time period is longer than the first time period.

19. The system of claim 17, wherein the receiver module is configured to receive at least one of the one or more opportunistic traffic flows after the first time period but within the second time period.

* * * * *